United States Patent
Ritchie et al.

(10) Patent No.: US 11,908,998 B2
(45) Date of Patent: Feb. 20, 2024

(54) LIQUID ELECTROLYTE FOR LITHIUM METAL BATTERY

(71) Applicant: Apple Inc., Cupertino, CA (US)

(72) Inventors: Alan A. Ritchie, Menlo Park, CA (US); Bernd Jurgen Neudecker, Los Gatos, CA (US); Karl M. Brown, Los Gatos, CA (US); Andrew Basile, Santa Clara, CA (US)

(73) Assignee: APPLE INC., Cupertino, CA (US)

(*) Notice: Subject to any disclaimer, the term of this patent is extended or adjusted under 35 U.S.C. 154(b) by 534 days.

(21) Appl. No.: 16/922,332

(22) Filed: Jul. 7, 2020

(65) Prior Publication Data

US 2021/0083326 A1    Mar. 18, 2021

Related U.S. Application Data

(60) Provisional application No. 62/901,982, filed on Sep. 18, 2019.

(51) Int. Cl.
| | |
|---|---|
| *H01M 10/0568* | (2010.01) |
| *H01M 10/0569* | (2010.01) |
| *H01M 10/0567* | (2010.01) |
| *H01M 4/485* | (2010.01) |

(Continued)

(52) U.S. Cl.
CPC ....... *H01M 10/0567* (2013.01); *H01M 4/382* (2013.01); *H01M 4/485* (2013.01); *H01M 10/052* (2013.01); *H01M 10/0568* (2013.01); *H01M 10/0569* (2013.01); *H01M 2300/0025* (2013.01)

(58) Field of Classification Search
CPC .......... H01M 10/052; H01M 10/0567; H01M 10/0568; H01M 10/0569; H01M 4/382; H01M 4/485; H01M 2300/0025
See application file for complete search history.

(56) References Cited

U.S. PATENT DOCUMENTS

| | | | |
|---|---|---|---|
| 2014/0038059 A1* | 2/2014 | Li | H01M 10/058 29/623.2 |
| 2017/0346137 A1 | 11/2017 | Chang et al. | |
| 2018/0062206 A1 | 3/2018 | Yang et al. | |

(Continued)

FOREIGN PATENT DOCUMENTS

CN        103354297 A    10/2013

OTHER PUBLICATIONS

ScienceDirect, "Synthesis and Evaluation of a novel pyrrolidinium-based zwitterionic additive with an ether side chain for ionic liquid electrolytes in high-voltage lithium-ion batteries", Author: Horiuchi et al., Electrochimica Acta, vol. 241, Jul. 1, 2017, pp. 272-280 (2 pp).

(Continued)

*Primary Examiner* — Osei K Amponsah
(74) *Attorney, Agent, or Firm* — Young Basile Hanlon & MacFarlane, P.C.

(57) ABSTRACT

Liquid electrolytes for a lithium metal battery comprise an aprotic solvent, an ionic liquid, a lithium salt, 8 mol % to 30 mol % hydrofluoroether and up to 5 mol % additives. A molar ratio of the hydrofluoroether to the lithium salt is 0.22:1 to 0.83:1. The liquid electrolytes achieve at least a 50% improvement in cycle life over conventional electrolytes, extend capacity retention and delay increases in internal resistance.

10 Claims, 2 Drawing Sheets

(51) Int. Cl.
*H01M 10/052* (2010.01)
*H01M 4/38* (2006.01)

(56) References Cited

U.S. PATENT DOCUMENTS

2019/0097232 A1 3/2019 Choi et al.
2019/0123390 A1 4/2019 Xu et al.
2019/0140322 A1 5/2019 Ren et al.

OTHER PUBLICATIONS

Electronics Weekly, "Electrolyte found for room-temperature flourine-ion batteries", Author: Steve Bush, Dec. 7, 2018, www.electronicsweekly.com/news/research-news, (3 pp).

US Department of Energy, Fiscal Year 2018: Second Quarter, Progress Reports: Advanced Battery Materials Research (BMR) Program & Battery500 consortium Program, Jun. 2018, BMR Quarterly Report (161 pp).

Solvionic, "LiFSI based Net Generation Electrolytes", LiFSI as a promising salt for Lithium-ion Batteries!, www.solvionic.com, Date Unknown, downloaded Jun. 20, 2019 (2 pp).

Stenzel, et al., "Chromatographic Techniques in the Research Area of Lithium Ion Batteries: Current State-of-the-art", www.mdpi.com, Separations, 2019, https://doi.org/10.3390/separations6020026 (100 pp).

ScienceDirect, "Lithium bis(fluorosulfonyl)imide (LiFSI) as conducting salt for nonaqueous liquid electrolytes for lithium-ion batteries: Physicochemical and electrochemical properties", Authors: Han, et al., Journal of Power Sources, vol. 196, Issue 7, Apr. 1, 2011, pp. 3623-3632 (2 pp).

Nippon Shokubai Co. Ltd., "Electrolyte for Lithium-Ion Batteries 'LiFSI'", www.shokubai.co.jp/en/products/environment/ifsi.html, Date Unknown, downloaded Jun. 20, 2019 (2 pp).

Ren, et al., "Localized High-concentration Sulfone; Electrolytes for High-Efficiency; Lithium-Metal Batteries", Chem, vol. 4, Supplemental Information, Date Unknown, Downloaded Jun. 20, 2019 (23 pp).

Science Direct, "Investigation of the N-butyl-N-methyl pyrrolidinium trifluoromethanesulfonyl-N-cyanoamide (PYR14TFSAM) ionic liquid as electrolyte for Li-ion battery", Authors: Hoffknecht et al., Electrochimica Acta, vol. 250, Oct. 1, 2017, pp. 25-34 (2 pp).

\* cited by examiner

LIQUID ELECTROLYTE FOR LITHIUM METAL BATTERY

CROSS-REFERENCE TO RELATED APPLICATION

This application claims priority to Provisional Application Ser. No. 62/901,982, filed on Sep. 18, 2019, the entirety of which is hereby incorporated by reference.

TECHNICAL FIELD

This application generally relates to a liquid-based electrolyte for lithium metal batteries comprising both ionic liquid and a hydrofluoroether, resulting in improved cell performance.

BACKGROUND

Lithium metal batteries have received significant attention as advanced high-performance next generation batteries. However, these high voltage rechargeable batteries can face performance obstacles due at least in part to high reactivity between the battery components and traditional electrolytes. For example, the thermodynamic instability of lithium metal can cause irreversible and continuous reactions between lithium metal and the electrolyte that generate thick solid electrolyte interphase (SEI) layers on the lithium metal surface, consume lithium and electrolyte, and increase the internal resistance, thus shortening cycle life. Large volumetric changes can occur in the lithium metal anode during repeated cycling, but the aforementioned SEI films can be too frail to fully suppress such significant changes in the lithium metal electrode. The resulting structural instability limits the applications of these batteries.

SUMMARY

The disclosed embodiments provide a liquid electrolyte for a lithium metal battery. One embodiment of a liquid electrolyte for a lithium metal battery comprises an aprotic solvent, an ionic liquid, a lithium salt, 8 mol % to 30 mol % hydrofluoroether and up to 5 mol % additives. A ratio of the hydrofluoroether to the lithium salt is 0.22:1 to 0.83:1.

In some embodiments, the ratio of the hydrofluoroether to the lithium salt is 0.22:1 to 0.7:1.

In some embodiments, a ratio of the hydrofluoroether to the aprotic solvent is 0.1:1 to 1:1.

In some embodiments, the ratio of the hydrofluoroether to solvent is 0.15:1 to 0.5:1, wherein the solvent is the aprotic solvent and the ionic liquid.

In some embodiments, a ratio of hydrofluoroether to the ionic liquid is 0.5:1 to 10:1.

The aprotic solvent can be a linear carbonate, a cyclic carbonate, or a linear ether selected from the group consisting of monoglyme, diglyme, triglyme, tetraglyme, a cyclic ether or a cyclic acetal.

In some embodiments, the aprotic solvent is dimethyl carbonate (DMC).

The hydrofluoroether can be 1,1,2,2-tetrafluoroethyl-2,2,3,3-tetrafluoropropyl ether (TTE), bis(2,2,2-trifluoroethyl) ether (BTFE), 1,1,2,2-tetrafluoroethyl-2,2,2-trifluoroethyl ether (TFTFE), tris(hexafluoroisopropyl) phosphate, tris(2,2,2-trifluoroethyl) borate, or any combination thereof.

In some embodiments, the hydrofluoroether is BTFE.

The ionic liquid can be N-propyl-N-methylpyrrolidinium bis(fluorosulfonyl)imide ($PYR_{13}FSI$), N-butyl-N-methylpyrrolidinium bis(fluorosulfonyl)imide ($PYR_{14}FSI$); N-propyl-N-methylpyrrolidinium bis(trifluoromethanesulfonyl)imide ($PYR_{13}TFSI$); or N-butyl-N-methylpyrrolidinium bis(trifluoromethanesulfonyl)imide ($PYR_{14}TFSI$), as well as other lithium compatible ionic liquids.

The lithium salt can be lithium bis(fluorosulfonyl)imide (LiFSI), lithium bis(trifluoromethanesulfonyl)imide (LiTFSI), and lithium bis(pentafluoroethanesulfonyl)imide (LiBETI).

In one embodiment, the aprotic solvent is DMC, the ionic liquid is $PYR_{13}FSI$, the lithium salt is LiFSI, and the hydrofluoroether is BTFE, the liquid electrolyte having the following composition: 29 mol % LiFSI+7 mol % $PYR_{13}FSI$+44 mol % DMC+20 mol % BTFE.

Also disclosed is a lithium metal battery having a cathode, an anode and the liquid electrolytes disclosed herein.

DETAILED DESCRIPTION

Figure 1B:
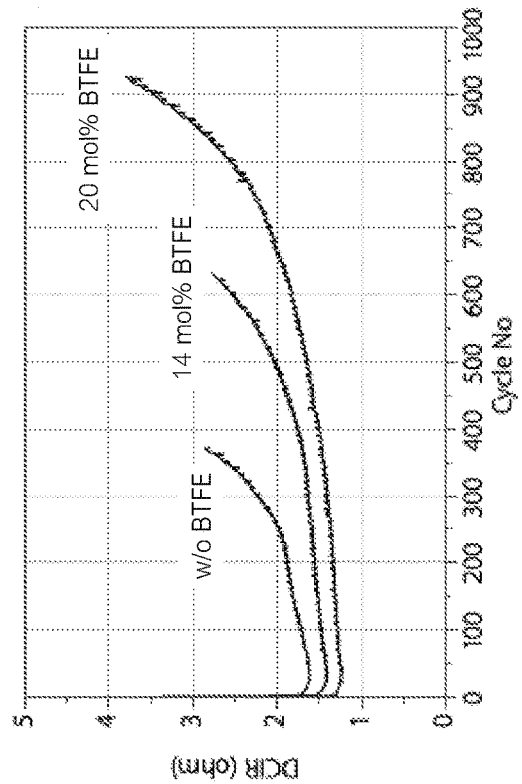
FIG. 1B is a graph of the direct current internal resistance (DCIR) versus number of cycles comparing the cell using the liquid electrolyte without a hydrofluoroether and the cells using the liquid electrolytes with hydrofluoroether.

Liquid electrolytes for lithium metal batteries should be chemically compatible with metallic lithium, allow for cell reversibility utilizing a suitable cathode material, be thermodynamically stable at high voltage, and be non-flammable. However, conventional liquid electrolytes fail to provide one or more of these requirements. In some cases, high reactivity between the battery components and traditional electrolytes results in structural instability and cathode/electrolyte interface degradation. Transition metal cathode materials, for example, can have catalytically active surfaces that promote the decomposition of conventional electrolytes, resulting in corrosive species that structurally degrade the cathode material.

Conventional organic solvent electrolytes, for example, are not thermodynamically stable at high voltages. Ether electrolytes may decompose at the cathode above 4V and carbonate electrolytes can be unstable with the lithium anode material at any voltage. Organic solvent electrolytes can also have low flash points. As an example, 1,2-dimethoxyethane (DME) has a flash point of −2° C. and dimethyl carbonate (DMC) has a flash point of 17° C. The flash points of organic solvents improve when lithium salt is added, but still do not reach non-flammable ratings. As examples, DME with 10 mol % LiFSI has a flash point of less than 25° C. and DME with 40 mol % LiFSI has a flash point of less than 40° C.

Disclosed herein are liquid electrolytes for lithium metal batteries that are chemically compatible with the anode material, are non-flammable, are thermodynamically stable at voltages over 4V, suppress the instability of the cathode material and suppress the decomposition of the electrolyte. The liquid electrolytes disclosed herein achieve at least a 50% improvement in cycle life over known electrolytes, extend capacity retention and delay increases in internal resistance.

One embodiment of a liquid electrolyte for a lithium metal battery comprises an aprotic solvent, an ionic liquid compatible with lithium metal, a lithium salt, 8 mol % to 30 mol % hydrofluoroether and up to 5 mol % additives. A molar ratio of the hydrofluoroether to the lithium salt is 0.22:1 to 0.83:1, and more particularly, 0.22:1 to 0.7:1. All ranges disclosed herein are inclusive.

The molar ratio of the hydrofluoroether to the aprotic solvent can be 0.1:1 to 1:1, more particularly 0.15:1 to 0.8:1, and even more particularly 0.15:1 to 0.5:1. In some embodiments, the molar ratio of the hydrofluoroether to solvent can be 0.1:1 to 0.8:1, and more particularly 0.15:1 to 0.5:1. "Solvent" here refers to the total of both the aprotic solvent and the ionic liquid. In some embodiments, a molar ratio of hydrofluoroether to the ionic liquid is 0.5:1 to 10:1.

The lithium ion, its anion, the ionic liquid cation, and its anion are solvated to form a complex such that the aprotic solvent is bound in the mixture, resulting in high flash points even when aprotic solvents with low flash points are used. The ionic liquid is a salt, yet already molten. The ionic liquid and the aprotic solvent are very miscible with each other, resulting in their particular solvation interaction. The cell reversibility is significantly improved with these electrolytes due to the ability of the mixture to solvate unusually high salt content. The ionic liquid, which is typically non-flammable and chemically compatible with lithium metal, increases the flash point of the electrolyte while improving the cell stability. Although ionic liquids have limited transport properties, the large amount of lithium salt in the electrolyte negates these limited properties. As the lithium salt content increases, the viscosity of the ionic liquid increases and cell wetting decreases. The mixture of the ionic liquid and the aprotic solvent balances out the viscosity.

The addition of the hydrofluoroether, in part, improves the wettability of the liquid electrolyte as the lithium salt is not very soluble in the hydrofluoroether. It is believed that the relationship between the high molarity lithium salt component and the low molarity hydrofluoroether component, in combination with the stabilizing ionic liquid and the aprotic solvent, is the key to the improved performance metrics realized in test cells using the liquid electrolyte. The performance metrics fall off when the hydrofluoroether:lithium salt ratio falls outside of the 0.22:1 to 0.83:1 range, and more particularly, outside of the 0.22:1 to 0.7:1 range.

The hydrofluoroether can be, but is not limited to, 1,1,2,2-tetrafluoroethyl-2,2,3,3-tetrafluoropropyl ether (TTE), bis(2,2,2-trifluoroethyl) ether (BTFE), 1,1,2,2-tetrafluoroethyl-2,2,2-trifluoroethyl ether (TFTFE), and any combination thereof. As used herein, the term hydrofluoroether also includes tris(hexafluoroisopropyl) phosphate, tris(2,2,2-trifluoroethyl) borate and other like heteroatom-centered hydrofluoroether functionalized compounds.

The aprotic solvent can be one or more of a linear carbonate, a cyclic carbonate, or a linear ether selected from the group consisting of monoglyme, diglyme, triglyme and tetraglyme, a cyclic ether such as dioxane (DIOX) or a cyclic acetal such as dioxolane (DOL). As non-limiting examples, DME, ethyl methyl carbonate (EMC), DMC, and diethyl carbonate (DEC) are suitable aprotic organic solvents.

The ionic liquid should be compatible with the lithium anode. Examples include N-ethyl-N-methylpyrrolidinium bis(fluorosulfonyl)imide ($PYR_{12}FSI$), N-propyl-N-methylpyrrolidinium bis(fluorosulfonyl)imide ($PYR_{13}FSI$), N-butyl-N-methylpyrrolidinium bis(fluorosulfonyl)imide ($PYR_{14}FSI$); N-propyl-N-methylpyrrolidinium bis(trifluoromethanesulfonyl)imide ($PYR_{13}TFSI$); or N-butyl-N-methylpyrrolidinium bis(trifluoromethanesulfonyl)imide ($PYR_{14}TFSI$). Other ionic liquids compatible with lithium can also be used, such as, but not limited to, tetrafluoroborate ($BF_4$), hexafluorophosphate ($PF_6$), triflate (OTf) and bis(pentafluoroethanesulfonyl)imide (BETI) and phosphonium or ammonium cations. Ionic liquids such as imidazolium are not compatible with the lithium anode.

The lithium salt should not be sensitive to moisture so that it does not break down. The lithium salt should have weakly coordinating anions and be hydrolytically stable. Non-limiting examples of the lithium salt is lithium bis(fluorosulfonyl)imide (LiFSI), lithium bis(trifluoromethanesulfonyl)imide (LiTFSI), and lithium bis(pentafluoroethanesulfonyl)imide (LiBETI). One or a combination of lithium salts can be used.

The additives are those known to the skilled artisan that may be used to improve electrolyte performance by improving, for example, the electrolyte conductivity or thermal stability. Non-limiting examples include vinylene carbonate, vinyl ethylene carbonate and lithium salts such as LiF and $LiNO_3$.

In some embodiments, the aprotic solvent is DMC, the ionic liquid is $PYR_{13}FSI$, the lithium salt is LiFSI, and the hydrofluoroether is BTFE, the liquid electrolytes having the following compositions:

30 mol % LiFSI+8 mol % $PYR_{13}FSI$+45 mol % DMC+17 mol % BTFE;

31 mol % LiFSI+9 mol % $PYR_{13}FSI$+46 mol % DMC+14 mol % BTFE;

29 mol % LiFSI+7 mol % $PYR_{13}FSI$+44 mol % DMC+20 mol % BTFE.

Some other embodiments have BTFE between 13 mol % and 21 mol %, inclusive, with the other elements adjusting to accommodate while maintaining the molar ratios of hydrofluoroether to lithium salt of 0.22:1 to 0.83:1; hydrofluoroether to aprotic solvent of 0.1:1 to 1:1; and hydrofluoroether to solvent of 0.15:1 to 0.5:1.

Figure 1A:
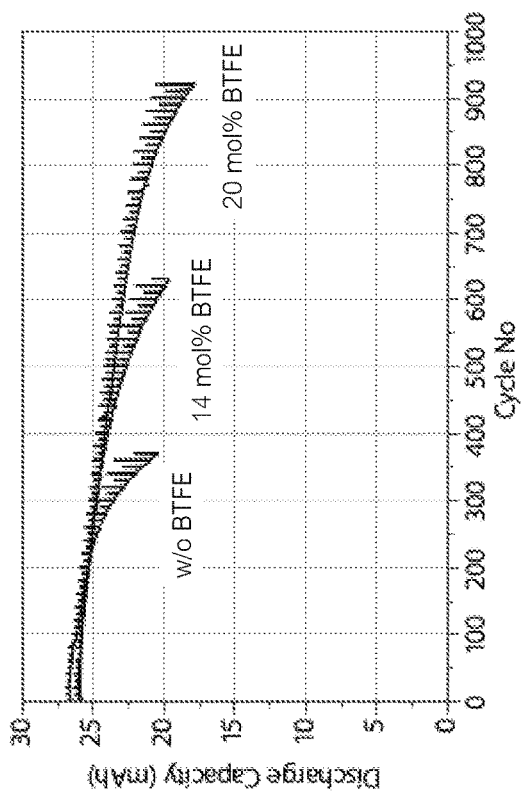
FIG. 1A is a graph of the discharge capacity versus number of cycles comparing a cell using a liquid electrolyte without a hydrofluoroether and cells using liquid electrolytes with hydrofluoroether.

The liquid electrolytes disclosed herein can improve the cycle life of a battery cell by 50% or more, can extend capacity retention and can delay DCIR increase. FIGS. 1A and 1B are graphs illustrating the improved cell performance. FIGS. 1A and 1B compare performance of a cell using a liquid electrolyte without a hydrofluoroether to cells using liquid electrolytes as disclosed herein. In particular, the two liquid electrolytes used to achieve the cell performance shown in FIGS. 1A and 1B have the following compositions. The electrolyte with 14 mol % BTFE has the following composition:

31 mol % LiFSI+9 mol % $PYR_{13}FSI$+46 mol % DMC+14 mol % BTFE.

The molar ratio of hydrofluoroether to lithium salt is 0.45:1. The ratio of hydrofluoroether to aprotic solvent is 0.30. The ratio of hydrofluoroether to total solvent is 0.25. The ratio of hydrofluoroether to ionic liquid is 1.56. The electrolyte with 20 mol % BTFE has the following composition:

29 mol % LiFSI+7 mol % $PYR_{13}FSI$+44 mol % DMC+20 mol % BTFE.

The molar ratio of hydrofluoroether to lithium salt is 0.69:1. The ratio of hydrofluoroether to aprotic solvent is 0.46:1. The ratio of hydrofluoroether to total solvent is 0.39. The ratio of hydrofluoroether to ionic liquid is 2.86. The 12 $cm^2$ cell used a 10 μm lithium metal anode, 14 μm ceramic coated polyethylene and 39 μm $LiCoO_2$ cathode. The cycle test was performed at 4.25-3.0V; C/5 discharge in cycles 1, 10, 30, 50, 70, etc.; C/10 discharge in cycles 20, 40, 60, 80, etc.; C/2 discharge in all other cycles; and C/7 charge for all cycles.

FIG. 1A graphs discharge capacity against number of cycles. The cell using the liquid electrolyte without the hydrofluoroether only achieved about 360 cycles with 80% capacity retention or higher while the cell using the liquid electrolyte with 14% hydrofluoroether as disclosed herein achieved about 630 cycles with 80% capacity retention or higher and the cell using the liquid electrolyte with 20% hydrofluoroether as disclosed herein achieved about 900 cycles with 80% capacity retention or higher.

FIG. 1B graphs DCIR against number of cycles. The cell using the liquid electrolyte without the hydrofluoroether saw a DCIR increase (above 2.5 ohms) at about 340 cycles while the cell using the liquid electrolyte with 14% hydrofluoroether as disclosed herein did not see the DCIR increase to over 2.5 ohms until about 600 cycles and the cell using the liquid electrolyte with 20% hydrofluoroether as disclosed herein did not see the DCIR increase to over 2.5 ohms until about 800 cycles.

Figure 2:
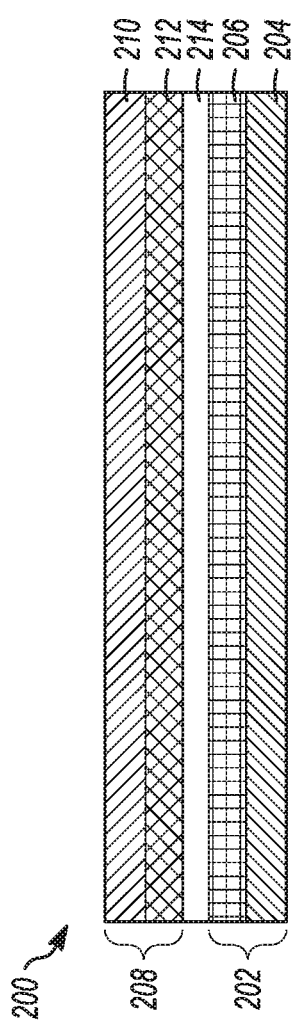
FIG. 2 is a cross-section view of a lithium metal battery as disclosed herein.

An aspect of the disclosed embodiments is a lithium metal battery 200, the layers of which are shown in cross-section in FIG. 2. The lithium metal battery 200 has an anode 202 with an anode current collector 204 and an anode active material 206 disposed on the anode current collector 204. The lithium metal battery 200 also has a cathode 208 with a cathode current collector 210 and a cathode active material 212 disposed over the cathode current collector 210. The cathode 208 and the anode 202 are separated by a separator 214 and the liquid electrolyte disclosed herein.

The cathode current collector 210 can be, for example, an aluminum sheet or foil. Cathode active materials 212 can include one or more lithium transition metal oxides which can be bonded together using binders and optionally conductive fillers such as carbon black. Lithium transition metal oxides can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_2O_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$. As needed, the cathode active material 212 can contain an electroconductive material, a binder, etc.

The anode active material 206 can comprise at least one selected from the group consisting of a metal material, an alloy material and a carbonaceous material. The anode active material 206 is not particularly limited, and can comprise lithium metals, lithium alloys, lithium-containing metal oxides, lithium-containing metal sulfides, lithium-containing metal nitrides, carbonaceous materials such as graphite, etc. The anode current collector 204 can be a copper or nickel sheet or foil, as a non-limiting example.

The separator 214 may be a single layer or multi-layer of polyethylene, polypropylene, and polyvinylidene fluoride, as non-limiting examples.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art.

What is claimed is:

1. A liquid electrolyte for a lithium metal battery, having the following composition:
    LiFSI;
    $PYR_{13}FSI$;
    DMC; and
    13 mol %-21 mol % BTFE, wherein a molar ratio of BTFE to LiFSI is 0.22:1 to 0.83:1, a molar ratio of BTFE to DMC is 0.1:1 to 1:1, and a molar ratio of BTFE to a total of DMC and $PYR_{13}FSI$ is 0.15:1 to 0.5:1.

2. The liquid electrolyte of claim 1, having the following composition:

30 mol % LiFSI+8 mol % $PYR_{13}FSI$+45 mol % DMC+17 mol % BTFE.

3. The liquid electrolyte of claim 1, wherein the LiFSI is 29 mol % of the liquid electrolyte.

4. The liquid electrolyte of claim 1, wherein the $PYR_{13}FSI$ is 8 mol % of the liquid electrolyte.

5. The liquid electrolyte of claim 1, wherein the DMC is 44 mol % of the liquid electrolyte.

6. The liquid electrolyte of claim 1, wherein the BTFE is 19 mol % of the liquid electrolyte.

7. The liquid electrolyte of claim 1, having the following composition:

29 mol % LiFSI+7 mol % $PYR_{13}FSI$+44 mol % DMC+20 mol % BTFE.

8. The liquid electrolyte of claim 1, having the following composition:

31 mol % LiFSI+9 mol % $PYR_{13}FSI$+46 mol % DMC+14 mol % BTFE.

9. The liquid electrolyte of claim 1, wherein the molar ratio of the BTFE to the LiFSI is 0.22:1 to 0.7:1.

10. A lithium metal battery, comprising:
    a cathode having a cathode current collector and a cathode active material comprising a lithium transition metal oxide;
    an anode having an anode current collector and an anode active material comprising lithium metal; and
    the liquid electrolyte of claim 1.

* * * * *